Jan. 17, 1933.    S. R. THOMAS    1,894,602
VEHICLE FRAME
Filed March 9, 1931    2 Sheets-Sheet 1
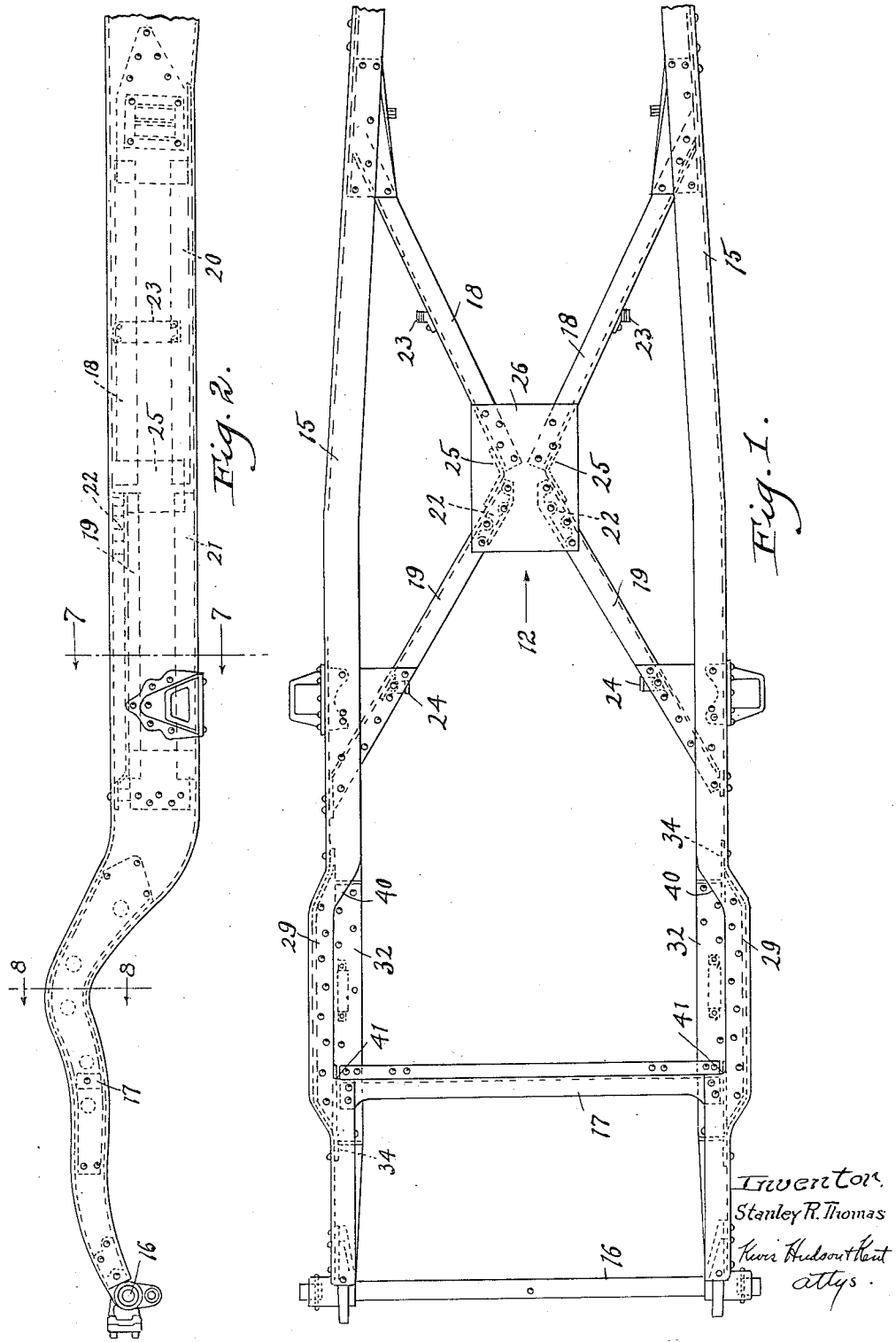

Jan. 17, 1933.  S. R. THOMAS  1,894,602
VEHICLE FRAME
Filed March 9, 1931  2 Sheets-Sheet 2
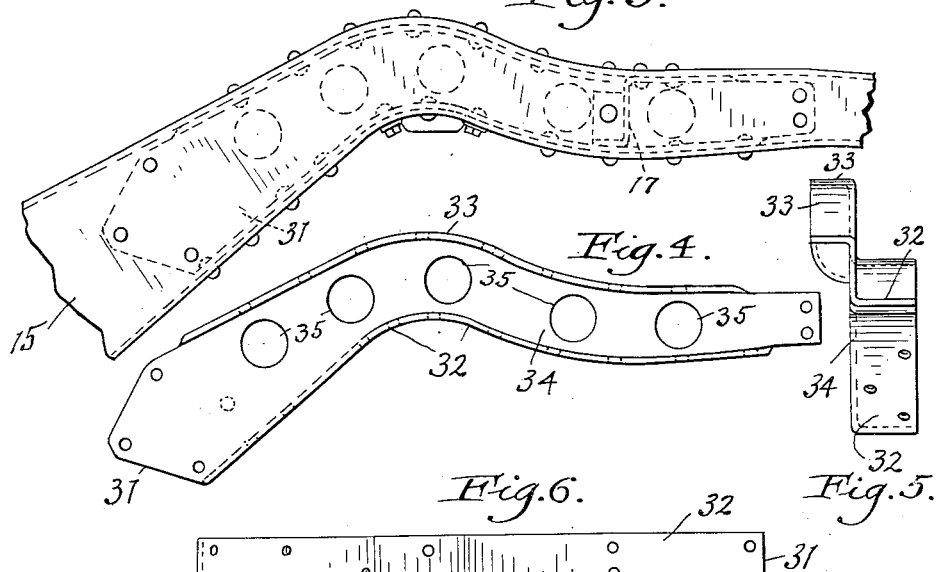
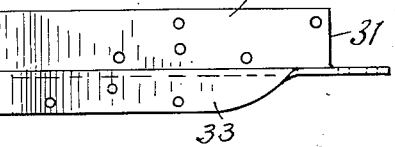
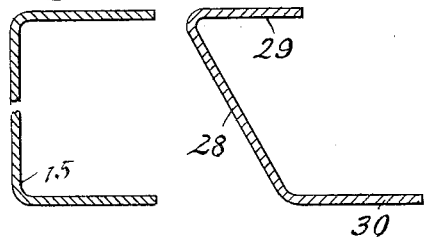
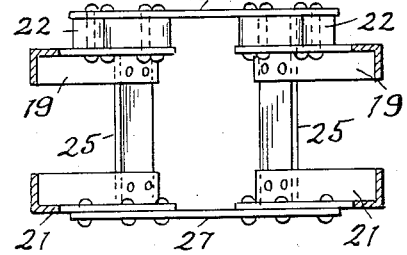
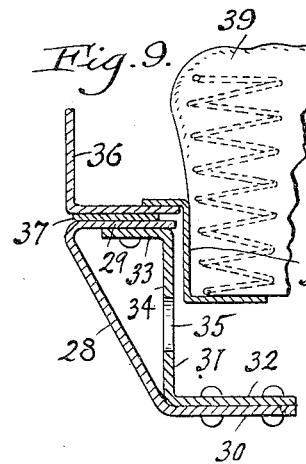
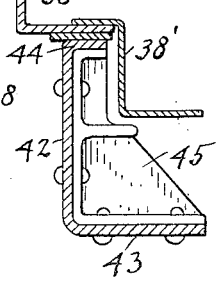
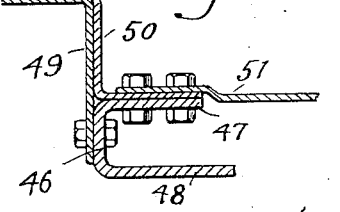
Inventor.
Stanley R. Thomas Patented Jan. 17, 1933

1,894,602

UNITED STATES PATENT OFFICE

STANLEY R. THOMAS, OF CLEVELAND HEIGHTS, OHIO, ASSIGNOR TO PEERLESS MOTOR CAR CORPORATION, OF CLEVELAND, OHIO, A CORPORATION OF OHIO

VEHICLE FRAME

Application filed March 9, 1931. Serial No. 521,045.

This invention relates to improvements in vehicle frames, particularly automobile frames.

One of the objects of the invention is the provision of means at the kick-up of the frame above the rear axle for enabling the rear seat of the vehicle to project down below the level of the upper flanges of the frame side bars at that point, so as to permit the roof of the body to be set relatively low while still providing the requisite amount of head room.

Another object is the provision of cross bracing of X-form, so designed as to accommodate the propeller shaft of a rear wheel drive automobile.

Other objects and features of novelty will appear as I proceed with the description of that embodiment of the invention which, for the purposes of the present application, I have illustrated in the accompanying drawings, in which Figure 1 is a plan view of the rear portion of an automobile frame embodying the invention.

Fig. 2 is a side elevation of the same.

Fig. 3 is a fragmental elevational view on a larger scale showing one side bar of the frame at the rear axle kick-up.

Fig. 4 is a detail elevational view of a reenforcing member which may be employed in connection with the invention.

Fig. 5 is an end view of the structure shown in Fig. 4.

Fig. 6 is a top plan view thereof.

Fig. 7 is a cross sectional detail of a side bar, the view being taken substantially on the line 7—7 of Fig. 2.

Fig. 8 is a similar view taken substantially on the line 8—8 of Fig. 2, the reenforcement being omitted.

Fig. 9 is a cross sectional view corresponding to Fig. 8, but showing in addition the reenforcing member, the body sill and the seat cushion support.

Figs. 10 and 11 are sectional views of a nature similar to Fig. 9, but illustrating modified forms of the invention, and Fig. 12 is a fragmental elevational view of the central portion of the cross bracing of the frame, the view looking in the direction of arrow 12, Fig. 1.

In the drawings I have shown a portion of an automobile frame built up principally of duralumin, or other light metal parts. The side bars 15 are relatively deep channels arranged with their flanges extending inwardly in the customary manner. The forward portion of the frame tapers inwardly toward the front, but the side bars of the rear portion are parallel. At the rear extremities of the side bars there is a tubular cross brace 16, and at a point a short distance behind the rear axle kick-up there is a cross brace 17 of Z-section.

Somewhat behind the middle point of the frame I provide cross bracing of the X-form, consisting essentially in an upper X and a lower X superposed and spaced apart vertically. The upper and lower elements of this bracing are joined at intervals by vertical spacing members. The space between the upper and lower elements is left unobstructed for a distance on either side of the intersection points however, and it is through this space that the propeller shaft of the vehicle is to extend. In practice, as illustrated in the drawings, I prefer to employ for this bracing eight angle bars arranged in pairs of upper and lower bars, the two pairs on one side of the center being joined at their inner ends by a vertical spacing bar, so that in effect there are two superposed V's on each side of the center of the frame. The two upper V's are connected by a gusset plate, and the two lower ones by a second gusset plate. By means of this construction I am enabled to avail myself of the entire vertical distance between the gusset plates to accommodate the vertical movements of the propeller shaft resulting from the vertical movements of the rear wheels with respect to the frame as the automobile travels over the road.

As shown in the drawings the upper V-braces on each side consist of the angle bars 18 and 19, and the lower V-braces of similar angle bars 20 and 21. The horizontal flanges of the bars 18 and 19 are uppermost, and the horizontal flanges of the bars 20 and 21 are lowermost. In order to permit a lower floor in the rear compartment of the automobile body, I have in the present instance lowered the bars 19 below the level of the bars 18, employing spacing blocks 22 for the purpose. Each superposed pair of bars 18, 20 is connected by spacing members 23, and similar bar spacing members 24 connect the bars 19, 21. At their inner ends the bars 18, 19 and 20, 21 on either side are joined by a V-shaped vertical spacing member 25. The V-braces on either side are thus interconnected to constitute a rigid arch, and the two arches are joined together by the gusset plates 26 and 27 to complete an X structure, which renders the frame as a whole exceptionally rigid.

The frame is provided with the usual kick-up at the rear axle position. However the form of the side bars at this point is entirely unconventional and constitutes one of the principal features of my invention. In the usual construction the height of the side bars at the kick-up determines the height of the rear seat of the car because, in order to make the seat as wide as it should be it is necessary for it to overlie the upper flanges of the side bars at the kick-up. The difficulty could be overcome by widening the frame at the rear, were it not for the fact that there is a practical limit to this width, because the rear wheels must stand outside the frame and must be spaced apart the width of the standard tread.

According to the present invention the upper flanges of the side bars at the kick-up are displaced outwardly, or otherwise disposed of, so that the rear seat of the car may overlie the frame proper and yet extend down considerably below the level which it would have to take were the upper flanges of the side bars continued over the kick-up in the usual or conventional manner.

In accordance with the preferred form of the invention I deflect outwardly the web and the upper flange of each side bar at the kick-up portion of the frame. In the drawings such outwardly deflected portion of the web is indicated at 28, and the resulting offset upper flange at 29. The bottom flange 30 is undisturbed. The extent of this deflection is preferably about as illustrated in Fig. 9, that is to say it is just sufficient to leave the space above the lower flange 30 unobstructed. This deflection necessarily weakens the frame somewhat, and in order to reenforce it at this point I mount within the side bar a reenforcing Z-bar 31, the lower flange 32 of which rests upon and is secured to the lower flange 30 of the side bar, and the upper flange 33 of which underlies and is secured to the upper flange 29 of the side bar. This reenforcement 31 is, of course, shaped to conform to the longitudinal shape of the frame bar, as indicated in detail in Figs. 4, 5 and 6, and in order to reduce its mass its vertical or web portion 34 may be provided at intervals with holes 35. The flange 29 is adapted to receive and support a body sill 36, a felt pad 37 being usually interposed. Between the sills 36 on opposite sides of the body frame extends a sheet metal or other light seat supporting frame 38, which is shown as depending into the spaces above the lower flanges 30 of the frame side bars. A seat cushion is roughly indicated at 39 in Fig. 9 as resting upon this seat frame.

As shown in Fig. 1, the inner edge of flange 29 at its forward end joins the inner edge of the upper flange of the main portion of the side bar in a gradual curve 40 which naturally results from the deflecting operation. At the rear however I cut out a short section of metal to produce a fairly sharp corner 41 opposite the upright portion of the Z-bar 17. The seat may extend into this corner, and its rear edge may bear against the Z-bar.

In Fig. 10 I have illustrated a modification wherein the vertical web 42 and the lower flange 43 of the seat bar at the kick-up are left undisturbed, and wherein the upper flange 44 is cut back considerably. The body sill 36 rests upon and is supported by this narrowed flange, and the seat frame 38' is carried by it as in the first modification, and hangs down into the space above the flange 43. The seat frame however cannot be quite so wide as in the modification previously described. In this form of the invention I brace the side bar at the kick-up by means of a section of formed metal 45, that is to say a casting or a forging, which fits closely within the side bar and is riveted or otherwise secured thereto.

In the form of the invention illustrated in Fig. 11, the web 46 of the side bar at the kick-up remains vertical, but its height is decreased by compressing the bar vertically. The horizontal flanges 47 and 48 are consequently brought more closely together than would be the case in a conventional construction, the lower flange 48 being maintained at the height required for axle clearance, and the flange 47 being brought down closer to it than in the conventional construction. An angle bar 49 is secured to the outer side of the web 46, and a Z-section 50 is secured to the upper side of the flange 47. These two elements 49 and 50 have adjoining vertical portions, and are both flanged outwardly along their upper adjoining edges. Together they form a heavy bracket upon which the body sill 36 is supported. In this case I have shown a seat frame 51 mounted upon the upper flange 47 of the frame bar, but it is to be understood of course that a seat frame similar to the frames 38 and 38' of Figs. 9 and 10 could be hung from the body sill in this modification if desired.

The kick-up construction above described has important advantages. It permits the use of a low rear seat and a consequent lower car, which is desirable as lowering the center of gravity and making the car more stable on the turns. The rear seat may be wide and the springs in the rear cushions may extend to the far ends. This is in contradistinction to some seat constructions where the seat sets down into the space between the frame side bars and is built out over those bars at the ends in order to add width, the built-out portions having no springs beneath them. The frame section over the kick-up may be as deep as necessary without affecting the car height. The frame is given added lateral rigidity, particularly in the case of the preferred form of Fig. 9, owing to the triangular box section at the kick-up. The rear springs may be mounted outside of the frame side rails, and the springs arranged directly adjacent the wheels, resulting in less side sway.

In the foregoing description I have necessarily gone somewhat into detail in order to explain fully the particular embodiments of the invention herein illustrated, but I desire it to be understood that such detailed disclosures are not to be construed as amounting to limitations, except as they may be included in the appended claims.

Having thus described my invention, I claim:

1. In a vehicle frame, side bars of channel section having a rear axle kick-up, the web and upper flange of each side bar at the kick-up being deflected outwardly, leaving a space above the lower flange unobstructed for a distance.

2. In a vehicle frame, side bars having a rear axle kick-up, each of said side bars comprising a web and upper and lower inturned flanges, the upper flange at the kick-up being displaced from its normal position to provide a space above the lower flange, adapted to receive a seat cushion, and means engaging the lower flange and the displaced upper flange for reenforcing the side bar at the kick-up.

3. In a vehicle frame, side bars of channel section having a rear axle kick-up, the web and upper flange of each side bar at the kick-up being deflected outwardly, leaving a space above the lower flange unobstructed for a distance, a Z-bar reenforcement having a lower flange attached to the lower flange of the side bar, a vertical web, and an upper flange attached to the upper flange of the side bar.

4. In a vehicle frame, side bars of channel section having a rear axle kick-up, the web and upper flange of each side bar at the kick-up being deflected outwardly, leaving a space above the lower flange unobstructed for a distance, and a reenforcement for said side bar at the kick-up comprising a vertical plate extending from the inner edge of the upper flange downwardly to the base of the web.

5. In a vehicle frame, side bars of channel section having a rear axle kick-up, the web and upper flange of each side bar at the kick-up being deflected outwardly, leaving a space above the lower flange unobstructed for a distance, and a Z-bar reenforcement for said side bar at the kick-up, the web of the Z-bar being vertically arranged and the upper and lower flanges being secured to the upper and lower flanges of the side bar.

6. In a vehicle frame, side bars of channel section with their flanges extending inwardly, the upper flanges being adapted to receive and support the body sills of the vehicle, a portion of each of said upper flanges at opposite points on the frame being removed from their normal positions in order to increase the space between the side bars above their lower flanges at that portion of the frame, and means engaging said flanges for reenforcing the frame at the said portions.

7. In a vehicle frame, side bars of channel section with their webs vertical and their flanges extending inwardly, the upper flanges being adapted to receive and support the body sills of the vehicle, a portion of each of said upper flanges at opposite points on the frame being cut away in order to increase the space between the side bars above their lower flanges at that portion of the frame, and a formed metal reenforcement mounted within and secured to each of said channels at the said portions.

In testimony whereof, I hereunto affix my signature.

STANLEY R. THOMAS.